Sept. 6, 1932.  C. H. PEDERSON  1,876,016
AUTO TIRE
Filed April 21, 1932
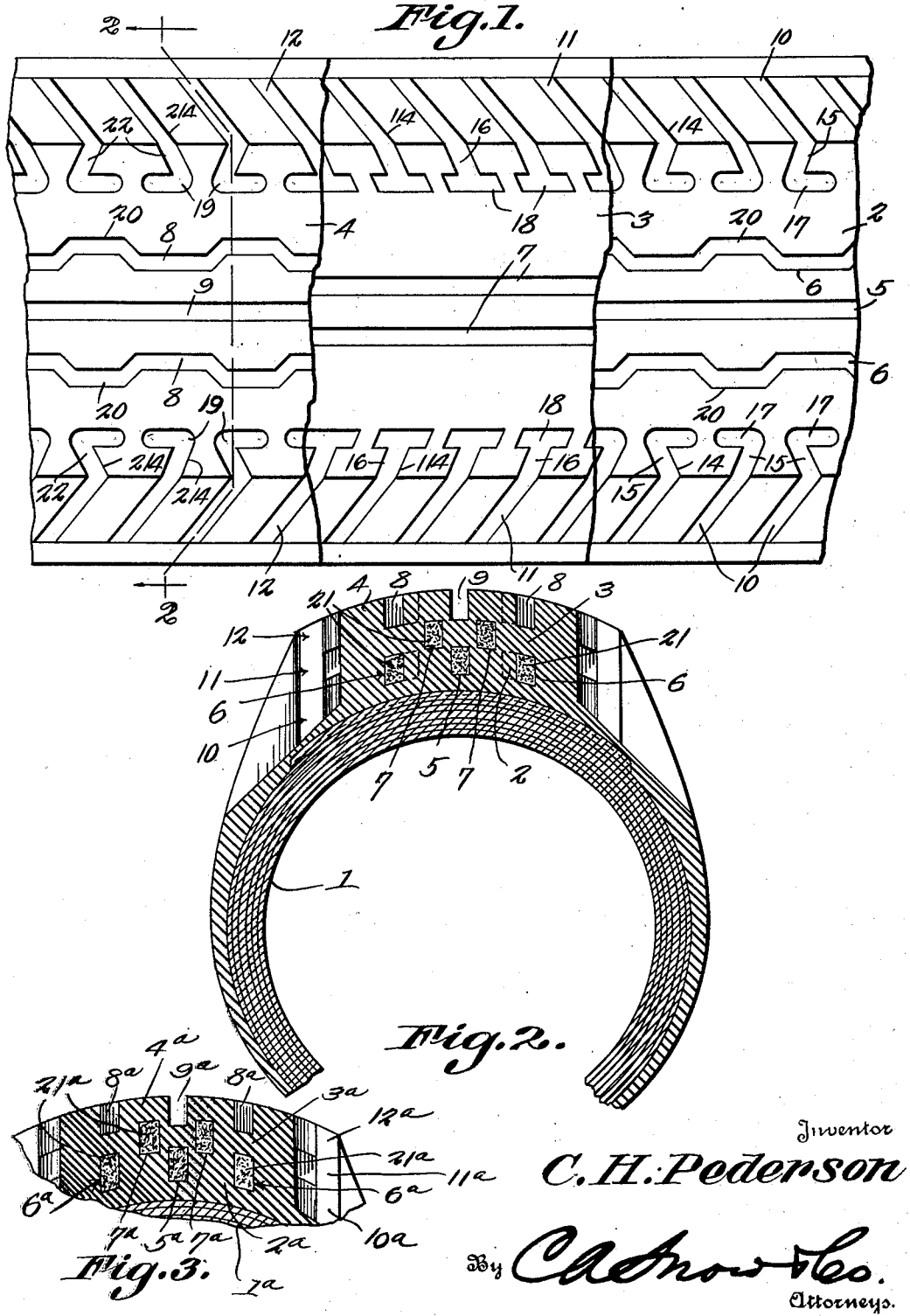

Patented Sept. 6, 1932

1,876,016

UNITED STATES PATENT OFFICE

CHRISTIAN H. PEDERSON, OF PITTSBURGH, PENNSYLVANIA

AUTO TIRE

Application filed April 21, 1932. Serial No. 606,730.

This invention aims to provide a tire for the wheels of vehicles of any kind, such as automobiles, trucks, aeroplanes, motorcycles, bicycles, buses or railroad cars, street car coaches and the like, which will provide a new tread, properly grooved to afford an anti-slipping surface, as an old tread wears away, it being possible to make the device either in double tread or triple tread form, and maintain the anti-skid surface until the tire has worn down to the body or carcass of the tire.

The invention aims to provide a device of the class described which may be embodied either in pneumatic tires or in solid tires.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that the invention is not confined to the particular form shown in the drawing, and that changes in the form shown in the drawing may be made within the scope of what is claimed, without departing from the spirit of the invention.

In the accompanying drawing:

Fig. 1 shows in top plan, a portion of a device constructed in accordance with the invention, and parts being successively broken away;

Fig. 2 is a transverse section on the line 2—2 of Fig. 1.

Fig. 3 is a cross section showing a modification.

The tire forming the subject matter of this application comprises a body 1, an inner tread 2, an intermediate tread 3, and an outer tread 4, the treads being secured together, and the inner tread 2 being secured to the body 1.

The inner tread 2 is provided with a first circumferential groove 5, located in the median plane of the tire, and the inner tread has second circumferential grooves 6 located on opposite sides of the first circumferential groove 5.

The intermediate tread 3 has transversely spaced circumferential grooves 7, located on opposite sides of the median plane of the tire and between the grooves 5 and 6 of the inner tread 2.

The outer tread 4 has circumferential grooves 8 and 9, duplicating respectively, the grooves 6 and 5 of the inner tread 2, and alined therewith. The grooves 6 are shown directly under the grooves 8, and the groove 5 directly under the groove 9, but this is not insisted upon.

All of the treads 2, 3 and 4 are provided in their outer edges with grooves comprising parts which are alined in all of the treads, the said parts of the treads 2, 3 and 4 being designated, respectively, by the numeral 10, 11 and 12. The parts 10, 11 and 12 are inclined circumferentially of the tire.

The grooves in the outer edges of the treads 2, 3 and 4 comprise heads. The V-shaped heads of the grooves of the tread 2 are designated by the numeral 14, the T-shaped heads in the tread 3 are designated by the numeral 114, and the V-shaped heads in the tread 4 are designated by the numeral 214. These heads comprise, in the tread 2, circumferentially extended parts 17, in the tread 3 circumferentially extended parts 18, and in the tread 4 circumferentially extended parts 19. The parts 17, 18 and 19 are alined in all of the treads. The heads 14 of the transverse grooves comprise transverse parts 15 in the tread 2, transverse parts 16 in the tread 3, and transverse parts 22 in the tread 4. The parts 15 and 22 of the treads 2 and 4, respectively, are in alinement, but the transverse parts 16 of the side grooves in the tread 3 cross the corresponding parts 15 and 22 of the grooves in the treads 2 and 4, respectively. The grooves 6 of the tread 2, and the grooves 8 of the tread 4 may comprise laterally extended portions 20. The grooves 6, 5 and 7 may be filled with sand, or soft rubber, or any other suitable substance.

Owing to the specific structure described and claimed, the tire will possess great strength and have the necessary resiliency, a new tread being presented as soon as an outer tread is worn away, and all of the treads being so grooved upon their outer surfaces that they will prevent slipping.

If the operator wishes, he may omit the filler 21 from the grooves 6, 5 and 7, and provide said air spaces at the places indicated. The treads are made of rubber or rubber compound, as is common in the art, and they may be vulcanized together or held as a unitary structure, in any desired way.

In Fig. 3, parts hereinbefore described are designated by numerals previously used, with the suffix "a". The modification consists in making the grooves 7a deep enough so that they will come into play before the tread is worn away to the bases of the grooves 8a and 9a, the grooves 6a having the same relation with respect to the grooves 7a.

What is claimed is:

A tire comprising a body, an inner tread, an intermediate tread and an outer tread, the treads being secured together, the intermediate tread and the inner tread being disclosed as the treads that are outwardly thereof are successively worn down, the inner tread being secured to the body, the inner tread having a first circumferential groove located in the median plane of the tire and second circumferential grooves located on opposite sides of the first-circumferential groove, the intermediate tread having transversely spaced circumferential grooves located on opposite sides of the median plane of the tire and between the first and second circumferential grooves of the inner tread, the outer tread having circumferential grooves duplicating the circumferential grooves of the inner tread, all of the treads being provided in their outer edges with grooves comprising parts which are alined in all of the treads, the last-specified grooves of the inner and outer treads having heads incuding transverse parts, circumferentially extended parts which are alined in all of the treads, the transverse parts of the grooves of the intermediate tread crossing the corresponding parts of the grooves of the inner and outer treads.

In testimony that I claim the foregoing as my own, I have hereto affixed my signature.

CHRISTIAN H. PEDERSON.